(12) United States Patent
Aisa et al.

(10) Patent No.: US 8,319,599 B2
(45) Date of Patent: Nov. 27, 2012

(54) ELECTRICAL APPLIANCE, IN PARTICULAR AN ELECTRICAL HOUSEHOLD APPLIANCE, A CORRESPONDING OPTIONAL AUXILIARY DEVICE, AND A SYSTEM COMPRISING SAID APPLIANCE AND DEVICE

(75) Inventors: Valerio Aisa, Fabriano (IT); Paolo Santonicola, Fabriano (IT); Valerio Cascio, Monsano (IT)

(73) Assignee: Indesit Company S.p.A., Fabriano (IT)

( * ) Notice: Subject to any disclaimer, the term of this patent is extended or adjusted under 35 U.S.C. 154(b) by 521 days.

(21) Appl. No.: 12/524,270

(22) PCT Filed: Jan. 10, 2008

(86) PCT No.: PCT/IB2008/000100
§ 371 (c)(1),
(2), (4) Date: Jul. 23, 2009

(87) PCT Pub. No.: WO2008/090432
PCT Pub. Date: Jul. 31, 2008

(65) Prior Publication Data
US 2010/0085144 A1    Apr. 8, 2010

(30) Foreign Application Priority Data
Jan. 24, 2007   (IT) .............................. TO2007A0051

(51) Int. Cl.
*G05B 23/02*   (2006.01)
*G01R 21/00*   (2006.01)
*G01R 21/06*   (2006.01)

(52) U.S. Cl. ........... 340/3.1; 307/39; 340/537; 340/657; 340/870.02; 702/62; 702/65

(58) Field of Classification Search .............. 307/30–42, 307/139–140; 702/57–62, 64–65; 340/3.1, 340/3.3–3.32, 12.32–12.39, 538–538.17, 340/635, 637, 657–664, 679, 870.02, 870.18, 340/870.39; 709/223–225; 710/15–17, 300–304
See application file for complete search history.

(56) References Cited

U.S. PATENT DOCUMENTS 4,468,541 A  *  8/1984  Cohen .......................... 379/393
(Continued)

FOREIGN PATENT DOCUMENTS

EP        0727664        8/1996
(Continued)

OTHER PUBLICATIONS

Ricci A et al: "Implementation and Test of a Power-Line Based Communication System for Electrical Appliances Networking" Power Line Communications and its Applications, 2006 IEEE International Symposium on Orlando, FL USA Mar. 26-29, 2006, pp. 239-244.

(Continued)

*Primary Examiner* — Benjamin C Lee
*Assistant Examiner* — Stephen Burgdorf
(74) *Attorney, Agent, or Firm* — Cesari and McKenna, LLP

(57) ABSTRACT

An electrical appliance (100) comprises a digital control system (SC), configured for enabling the performance of a plurality of pre-determined basic functions, and an auxiliary device (200) comprises means (PM, 230-231) for acquiring and/or processing auxiliary information. The electrical appliance (100) and the auxiliary device (200) moreover comprise respective communication means (270), for setting up between them a bi-directional communication of data. The control system (SC) of the electrical appliance (100) is provided for enabling execution of additional functions with respect to the basic functions and for sending to the auxiliary device (200), via the communication means (270), requests for auxiliary information, necessary for the performance of said additional functions. The auxiliary device (200) is pre-arranged for communicating to the control system (SC) of the electrical appliance (100), via the communication means (270), the auxiliary piece or pieces of information requested, as processed and/or acquired by the device itself.

21 Claims, 8 Drawing Sheets

U.S. PATENT DOCUMENTS

| | | | | |
|---|---|---|---|---|
| 5,436,510 A * | 7/1995 | Gilbert | | 307/38 |
| 5,491,463 A * | 2/1996 | Sargeant et al. | | 340/12.37 |
| 5,680,445 A * | 10/1997 | Bogner et al. | | 379/106.01 |
| 5,909,183 A * | 6/1999 | Borgstahl et al. | | 340/12.29 |
| 5,929,749 A * | 7/1999 | Slonim et al. | | 340/870.01 |
| 6,198,079 B1 * | 3/2001 | Essig | | 219/497 |
| 6,278,357 B1 * | 8/2001 | Croushore et al. | | 375/259 |
| 6,493,643 B1 * | 12/2002 | Aisa | | 702/60 |
| 6,552,525 B2 * | 4/2003 | Bessler | | 324/103 R |
| 6,603,218 B1 * | 8/2003 | Aisa | | 307/31 |
| 6,671,586 B2 * | 12/2003 | Davis et al. | | 700/295 |
| 6,853,291 B1 * | 2/2005 | Aisa | | 340/3.3 |
| 6,987,444 B2 * | 1/2006 | Bub et al. | | 370/463 |
| 6,993,417 B2 * | 1/2006 | Osann, Jr. | | 700/291 |
| 2001/0025349 A1 * | 9/2001 | Sharood et al. | | 713/340 |
| 2004/0037221 A1 * | 2/2004 | Aisa | | 370/229 |
| 2005/0055432 A1 | 3/2005 | Rodgers | | |
| 2005/0099314 A1 * | 5/2005 | Aisa | | 340/637 |
| 2005/0162282 A1 * | 7/2005 | Dresti et al. | | 340/825.72 |
| 2005/0185598 A1 * | 8/2005 | Grundstrom et al. | | 370/254 |
| 2005/0206505 A1 * | 9/2005 | Arcaria | | 340/286.01 |
| 2006/0123807 A1 * | 6/2006 | Sullivan et al. | | 62/129 |
| 2006/0143295 A1 * | 6/2006 | Costa-Requena et al. | | 709/227 |
| 2006/0274699 A1 * | 12/2006 | Faccin | | 370/331 |
| 2007/0297426 A1 * | 12/2007 | Haveson et al. | | 370/401 |
| 2008/0122585 A1 * | 5/2008 | Castaldo et al. | | 340/286.01 |
| 2008/0127325 A1 * | 5/2008 | Ebrom et al. | | 726/14 |
| 2008/0218148 A1 * | 9/2008 | Robertson et al. | | 323/349 |
| 2009/0134074 A1 * | 5/2009 | Doran | | 210/85 |
| 2009/0150356 A1 * | 6/2009 | Walker | | 707/3 |

FOREIGN PATENT DOCUMENTS

| | | |
|---|---|---|
| EP | 1465320 | 9/2007 |
| WO | WO 02/21664 | 3/2002 |
| WO | WO 02/084949 | 10/2002 |

OTHER PUBLICATIONS

Aisa V, Falcioni P, Pracchi P: "Connecting White Goods to a Home Network at a Very Low Cost", International Appliance Manufacturing 2004, Dec. 31, 2004, pp. 85-91.

* cited by examiner

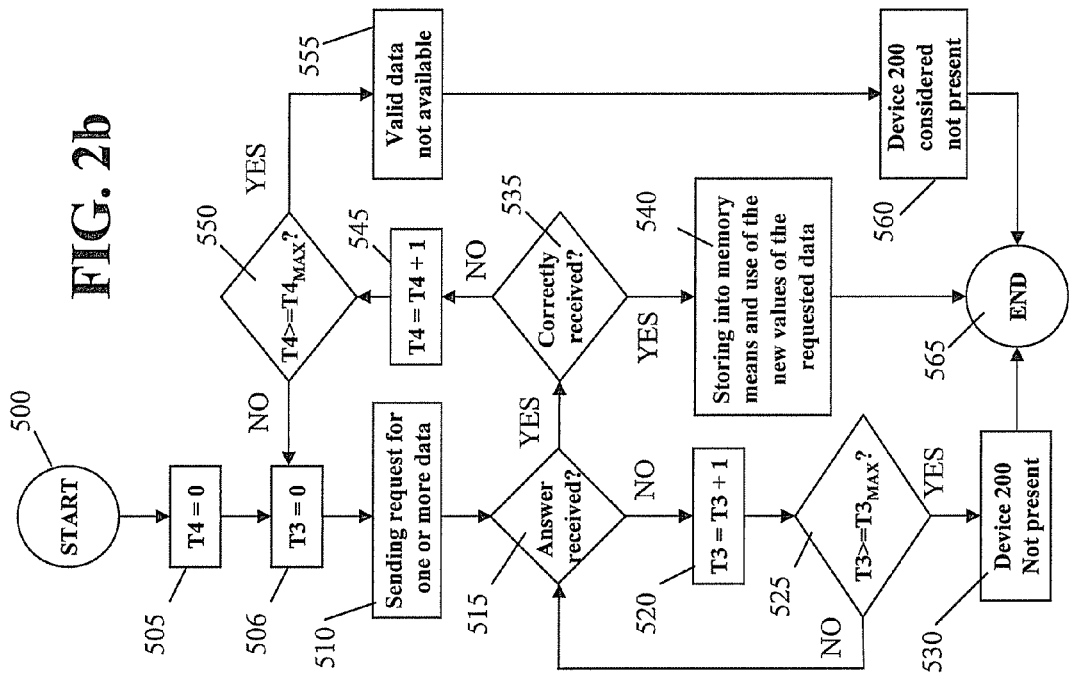

ELECTRICAL APPLIANCE, IN PARTICULAR AN ELECTRICAL HOUSEHOLD APPLIANCE, A CORRESPONDING OPTIONAL AUXILIARY DEVICE, AND A SYSTEM COMPRISING SAID APPLIANCE AND DEVICE

FIELD OF THE INVENTION

The present invention regards the field of electrical appliances having an electronic control system based upon a microprocessor and has been developed with particular reference to electrical household appliances.

In order to guarantee given levels of performance and correct operation of an electrical household appliance, the corresponding digital control system must acquire and process a set of information, typically regarding physical quantities or else regarding monitoring of operating cycles or processes associated to operation of the electrical household appliance itself Said information is acquired via purposely provided detection systems or devices, hereinafter referred to for reasons of simplicity by the term "sensors".

The larger the number of sensors on an electrical household appliance and the higher their quality, the higher the potential that the digital control system of the electrical household appliance manages to express in terms of number of functions performed and/or quality of performance offered. It is, however, evident that, the larger the number and the higher the quality of the sensors, the higher the impact of the latter on the total cost of the electrical household appliance. For this reason, manufacturers of electrical household appliances find themselves forced to adopt compromise solutions, which will enable the products to be competitive on the market. In effect, even though current systems of digital control of electrical household appliances are potentially able to carry out very refined and complex control functions—deriving from the use of powerful and inexpensive microcontrollers—the manufacturer is in practice forced to limit the performance thereof according to the type and quality of the sensors associated to each category of products.

BACKGROUND ART

There is known in the automobile industry the possibility of managing costly sensors, such as, for example, safety devices and/or satellite navigation systems, as optional accessories that, albeit not provided standard, the user can decide to add when purchasing a motor vehicle or at a later date. A similar approach could—in theory—be adopted also in the field of electrical household appliances, but it would entail high costs for provision of the optional sensors, both in relation to their mechanical housing within the product, and in relation to the need for their connection to the digital control system, as well as in relation to the specialized labour necessary for subsequent installation of said optional sensors. Consequently, such an approach does not appear practicable, according to the known art, for mass production of electrical household appliances and it might be hypothesized at the most only in the case of top-level products.

SUMMARY OF THE INVENTION

The general purpose of the present invention is to overcome the aforesaid drawbacks and to indicate a solution that, if need be, without involving significant increases in cost of production of an electrical appliance, particularly an electrical household appliance, may enable the corresponding control system to improve and/or extend its performance. In such a framework, a particular purpose of the invention is to indicate a solution that does not entail any mechanical pre-arrangement for housing one or more optional sensors within an electrical appliance or an electrical household appliance, and that does not require any wiring pre-arrangement for electrical connection of said optional sensor or sensors to the control system of the electrical appliance or electrical household appliance.

The above and other purposes still are achieved, according to the invention, by a system, an electrical appliance, in particular an electrical household appliance, and an auxiliary device having the characteristics recalled in the annexed claims, which form an integral part of the technical teaching provided herein in relation to the invention.

The idea underlying the present invention is to provide the electrical appliance, in particular an electrical household appliance, so as to enable exploitation of one or more auxiliary pieces of information, coming from an external and optional dedicated device that is able to carry out directly and/or indirectly the function of sensor and to interact with the control system of the electrical appliance.

The electrical appliance according to the invention is in any case prearranged for enabling basic characteristic functions of its own to be carried out, such as to guarantee satisfactory performance, even in the absence of the auxiliary device. The information supplied by the auxiliary device, when present, enables the control system to improve and/or extend the performance of the electrical appliance, with respect to the basic one, wherein:

the expression "improve the performance" is to be understood as increasing the real quality and/or the quality perceived by the user and/or the efficiency and/or the effectiveness of the result of the operations or functions performed by the electrical appliance during execution of its operating cycles or programs; and the expression "extend the performance" is to be understood as increasing the number of the possible operating cycles or programs that the electrical appliance can carry out, and/or increasing the number of the functions performed during at least one of the operating cycles or programs of the electrical appliance.

The digital control system of the electrical appliance is equipped with means for receiving information from, and possibly sending information to, the auxiliary device, as well as with means for interacting with the user, for example, represented by a control panel with display. On the other hand, the auxiliary device is equipped with means for measuring one or more physical quantities, in particular electrical quantities, as well as means for exchanging information in a "point-to-point" mode with the digital control system of the electrical appliance.

For the purposes of implementation of the invention, the control system of the electrical appliance requires a simple software pre-arrangement, which, as is known, does not induce additional costs on the product, but requires only once-and-for-all investments upstream, for its development. In the preferred—though not exclusive—embodiment, the transmission means used for sending information is the power-supply cable of the electrical appliance, and the technique of data transmission is of the "power modulation" type, the general principles of which are described, for example, in the article "Connecting white goods to a home network at a very low cost", Aisa et al., International Appliance Manufacturing, 2004, and in the international patent application WO 02/21664. Also the use of said communication technique does not involve significant increases in cost of the electrical appliance.

Advantageously, the auxiliary device can also be equipped with means for exchanging information in a "peer-to-peer" mode with any external communication network, possibly present in the environment in which the electrical appliance is installed: in this way, also auxiliary information possibly made available on the aforesaid network can be exploited by the control system of the electrical appliance.

The electrical appliance is preferably a household apparatus or device, which, in order to carry out its own function properly, also uses electrical energy, drawn from a domestic network through a supply cable connected to a current socket. Electrical household appliances of this type, indicated hereinafter purely by way of non-limiting example, are washing machines, dryers, dish-washers, electric ovens, gas ovens with electronic control system, electrical cooking hob, gas cooking hob with electronic control system, refrigerators, freezers, fridge-freezers, electrical water heaters, gas water heaters with electronic control system, toasters, electric stoves, coffee machines, air conditioners, heat pumps, gas boilers with electronic control, and any other similar electrical apparatus.

The improvement and/or extension of the performance of an electrical household appliance may consist, by way of non-limiting example, of one or more of the following:
  increase in the energy efficiency of the electrical household appliance;
  increase in the effectiveness of the result of the various functions performed by the electrical household appliance;
  increase in the capacity of self-diagnosis of the control system of the electrical household appliance;
  increase in the number of the functions performed by the electrical household appliance;
  increase in the amount of information made available to the user through appropriate means, with which the electrical household appliance is possibly equipped (for example, a display of its control panel);
  increase in the safety of the electrical household appliance in regard to the user;
  possibility for the control system of the electrical household appliance to exchange information with the local network to which the auxiliary device is possibly connected;
  possibility for the control system of the electrical household appliance to execute commands and/or satisfy requests coming from the aforesaid local network.

The information supplied by the auxiliary device, either spontaneously and/or on specific request from the control system of the electrical appliance, can be generated directly by the device itself and/or can be possibly acquired by the device through the aforesaid local network. For instance, the information generated by the auxiliary device can regard, by way of preferential but non-limiting example, measurements of electrical quantities associated to the source of electrical energy to which the electrical appliance is connected and/or to the operation of the electrical appliance itself. The information acquired by the auxiliary device through the aforesaid local network can be of any type useful for management of the control and operation of the electrical appliance.

BRIEF DESCRIPTION OF THE DRAWINGS

In what follows, the invention will be described in detail with reference to the attached plates of drawings, which are provided purely by way of non-limiting example, and in which:

FIG. 2b represents a flowchart similar to that of FIG. 2a, but regarding the request, by the control system, for specific information made available by the external auxiliary device according to the invention;

FIG. 2c represents a flowchart that describes the way in which the external auxiliary device responds to requests made by the control system of the electrical household appliance;

DESCRIPTION OF PREFERRED EMBODIMENTS OF THE INVENTION

Figure 1:
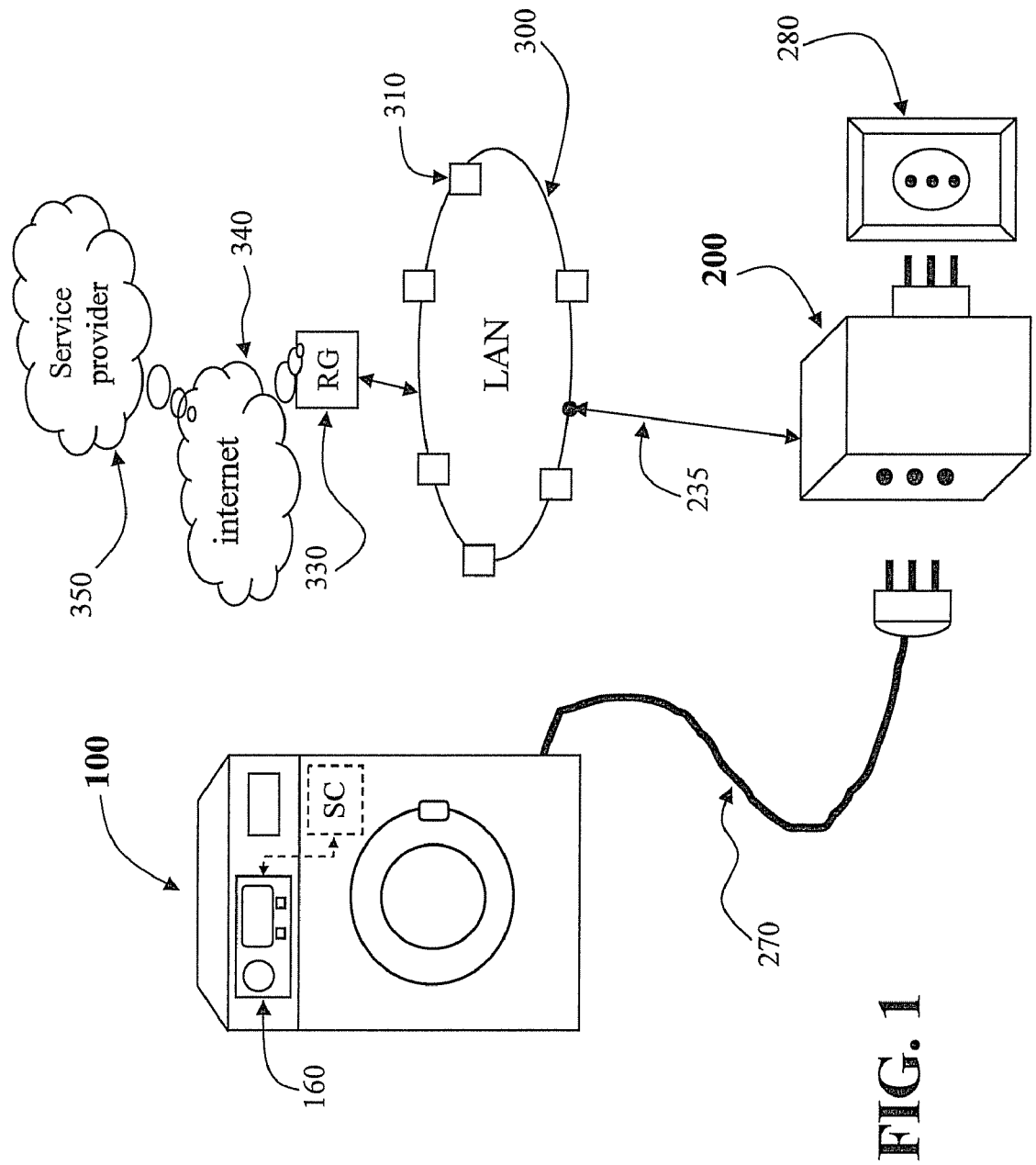
FIG. 1 represents the general architecture of a system according to the invention, which comprises an electrical household appliance with digital control system and an external auxiliary device, designed to generate information useful for operation of the electrical household appliance.

Represented schematically in FIG. 1 is a system according to the invention, comprising an electrical household appliance 100, equipped with a digital control system SC and having a user interface or control panel 160, which enables the user to interact with the system SC. The control system SC comprises a microcontroller, appropriately programmed and equipped with memory means, encoded in which is the information necessary for execution of the various functions of the electrical household appliance. The panel 160 is equipped with means (for example, push-buttons, selectors, warning lights, displays, etc.), adapted to enable the user to gain access to the functions and to the programs of the electrical household appliance 100, for their selection and/or display, as well as for data input.

The system according to the invention further comprises an auxiliary device 200, which, in the example represented, is operatively set between a normal electric-power socket 280 and the power-supply cable 270 of the electrical household appliance and is provided for interacting, in bi-directional point-to-point mode, with the control system SC, to supply the latter with auxiliary information useful for improving and/or extending the performance of the electrical household appliance.

The aforesaid auxiliary information can be generated at least in part by the same device 200 and/or can be obtained at least in part by the device 200 in an indirect way, through a bi-directional peer-to-peer connection thereof—designated as a whole by 235—to any local network 300, to which one or more sensor devices 310 are associated, which are able to generate information useful for operation of the electrical household appliance 100. In the example represented, the network 300 is also connected to the Internet—as represented schematically and designated by 340—through a gateway RG of a type in itself known, designated by 330.

Figure 6:
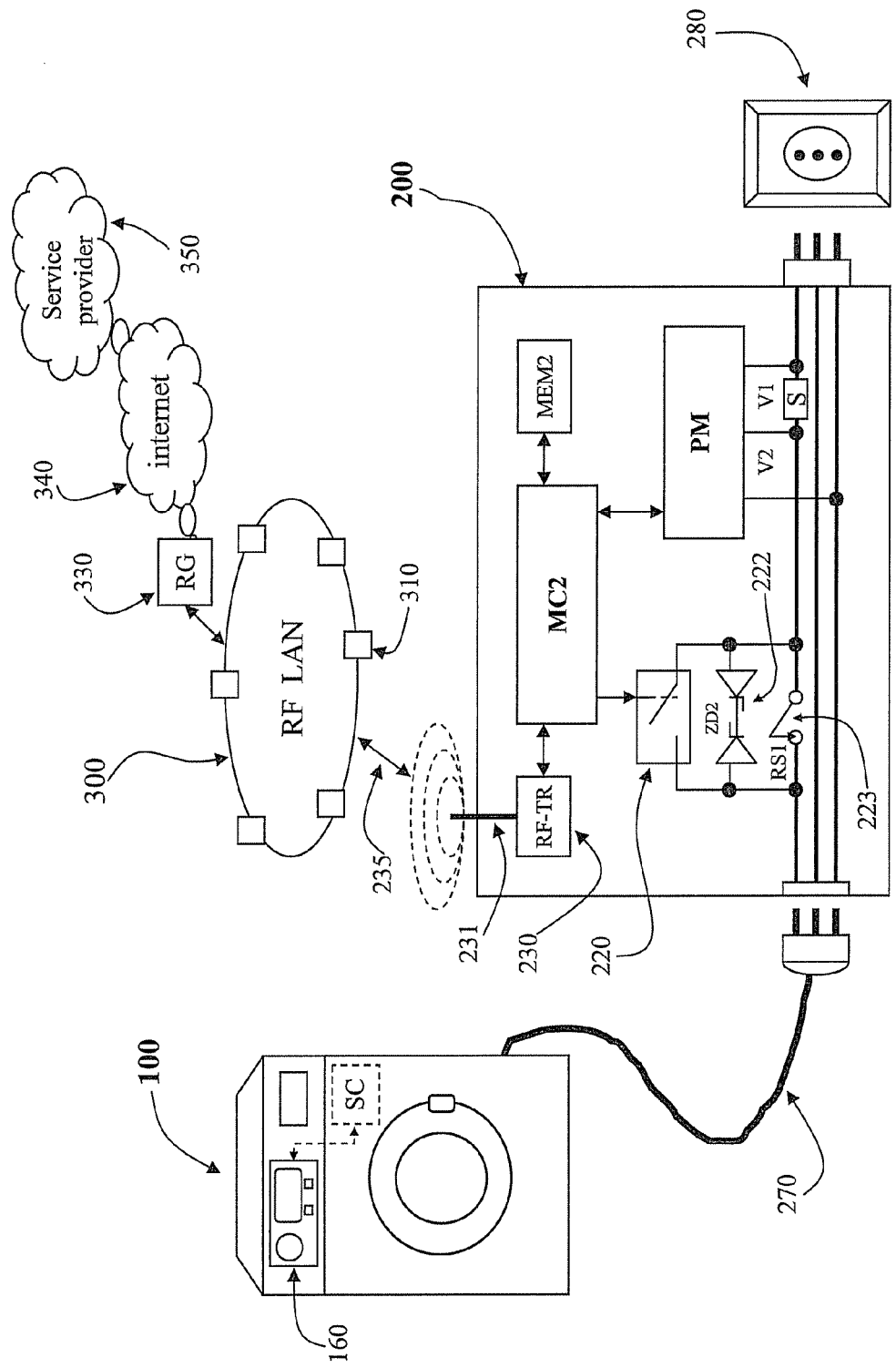
FIG. 6 is a partial and schematic representation of a possible example of the internal general architecture of an auxiliary device according to the invention.

The physical characteristics of the local network 300 and the corresponding communication protocol do not fall within the scope of the present invention and can be of any known type. Examples of local networks to which the auxiliary device 200 can be connected are, for example, the following: a network based upon narrow-band or else wide-band power line, a network based upon narrow-band or else wide-band radiofrequency, a network based upon electrical duplex cable or coaxial cable. Examples of protocols that can be associated to the aforesaid networks may be the following: LonTalk, EHS/Konnex, EIB, CEBus, X10, Z-Wave, ZigBee, Bluetooth, WiFi, TCP-IP, and any other standard or proprietary network protocol. Represented by way of non-limiting example in FIG. 6 is a case where the auxiliary device 200 is connected to the local network 300 through a radiofrequency communication system, the transceiver 230 of which, with the corresponding antenna 231, is serial-connected to a microcontroller MC2 of the auxiliary device.

The auxiliary information generated directly by the device 200, regards, by way of non-limiting example, one or more measurements of electrical quantities associated to the source of energy represented by the socket 280 and/or associated to operation of the electrical household appliance 100, such as for example: supply voltage, mains frequency, power and/or electric current absorbed by the electrical household appliance, angle of phase displacement between the supply voltage applied to the electrical household appliance and the electric current absorbed thereby, electrical energy consumed by the electrical household appliance with reference to a given time interval (for example, the duration of any one of its operating cycles) and/or to the period of time subsequent to a given date, defined by the user, and/or the entire period of time subsequent to initial installation of the electrical household appliance.

The information acquired by the auxiliary device 200 through the local network 300 and the sensor devices 310 can instead regard, by way of non-limiting example, one or more of the following quantities: current time (clock function), current date (calendar function), value of the total electrical power (contractual power) installed by the electrical-energy utility in the environment in which the electrical household appliance operates, cost of the electrical energy associated to the current time range and/or to possible other time ranges, possible messages for the user sent by the electrical-energy utility and/or by possible other "service providers" (said providers may be one or more remote centres, which are as a whole represented by block 350), possible warnings of conditions of excessive absorption of electrical power by the entire environment in which the electrical household appliance is installed, warnings of excessive variations of the mains frequency aimed at the function known as "Dynamic Demand Control" (DDC), possible alarm warnings associated to one or more sensors that may be present in the environment in which the electrical household appliance 100 is installed and connected to the same local network 300 to which the auxiliary device 200 is connected (for example, sensors for detecting the presence of gas, the presence of smoke, or flooding, etc.), possible messages for the user and/or other types of information and data available on the Internet and/or generated by devices and/or apparatuses and/or systems connected directly or indirectly to the local network 300.

Figure 2A:
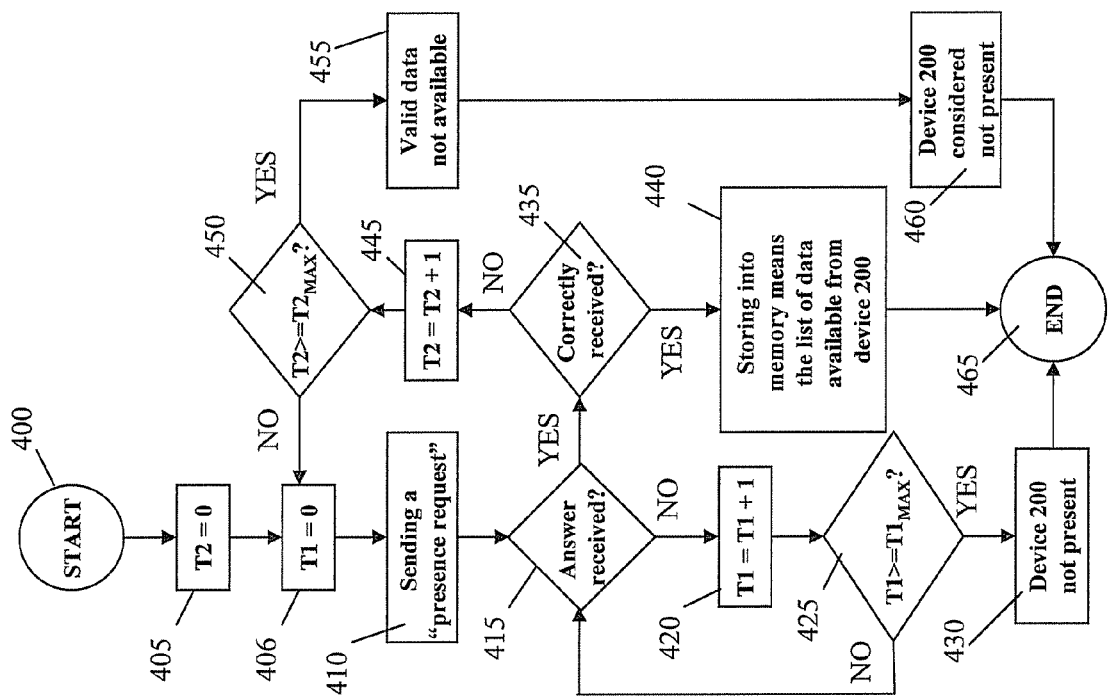
FIG. 2a represents a flowchart that describes a possible way in which, in a preferred embodiment of the invention, the digital control system of the electrical household appliance verifies the possible presence of the external auxiliary device.

Represented in FIGS. 2a and 2b are two flowcharts that describe, according to a preferred embodiment of the invention, the mode with which the control system SC of the electrical household appliance 100 verifies autonomously the presence or otherwise of the auxiliary device 200, and the mode with which the same control system SC executes requests for specific information in regard to the auxiliary device.

After start of each procedure (blocks 400 and 500 of FIG. 2a and FIG. 2b, respectively) the control logic initializes two time counters (T2 and T1, blocks 405 and 406 of FIG. 2a; T4 and T3, blocks 505 and 506 of FIG. 2b). The control system SC sees then to sending a "request for presence" of the device 200 (block 410 of FIG. 2a) or else a request for one or more auxiliary pieces of information to the device 200 (block 510 of FIG. 2b).

In either case, the control system SC considers the auxiliary device 200 as absent (blocks 420-430 of FIG. 2a; blocks 520-530 of FIG. 2b), or else not available to supply useful information (blocks 445-460 of FIG. 2a and blocks 545-560 of FIG. 2b), in the case where it does not receive any response to the aforesaid request (output NO from block 415 of FIG. 2a and output NO from block 515 of FIG. 2b) within a first time-out ($T1_{MAX}$ of FIG. 2a and $T3_{MAX}$ of FIG. 2b), or else in the case where it does not receive, within a second time-out ($T2_{MAX}$ of FIG. 2a and $T4_{MAX}$ of FIG. 2b), a valid response, i.e., a response in compliance with the rules of communication that define the bi-directional interaction between the control system SC and the auxiliary device 200 (output NO from block 435 of FIG. 2a and output NO from block 535 of FIG. 2b). In said circumstances (i.e., when a time-out event is verified), the operation of the electrical household appliance 100 coincides with the standard or basic one envisaged by its control system SC, when this finds itself having to operate in normal mode, i.e., without the contribution of additional information from an auxiliary device 200. This guarantees proper operation of the electrical household appliance 100 even when, at any moment and for any reason, the information coming from the auxiliary device 200 were to be interrupted, or else were to be received in an incorrect way by the control system SC (said interruption or incorrectness of reception may be detected by the control system through appropriate software verification instruments in themselves known, such as checksum or CRC, or any other mode of verification, associated to the communication protocol adopted for managing transfer of the data from the control system of the electrical household appliance 100 to the device 200, and vice versa).

In the case of FIG. 2a, the response sent by the device 200 to the control system SC consists of the list of the type of auxiliary information that the device itself is able to provide (block 440 of FIG. 2a), whereas, in the case of FIG. 2b, the response is the value of the piece or pieces of information selectively requested by the control system SC on the basis of the program that it is driving (block 540 of FIG. 2*b*). In the presence of a valid response (output YES from blocks 415 and 435 of FIG. 2*a*; output YES from blocks 515 and 535 of FIG. 2*b*), the control system SC stores the auxiliary information received from the device 200 in its own memory means.

The procedure through which the control system SC of the electrical household appliance verifies the presence of the auxiliary device 200 (represented schematically in FIG. 2*a*) is executed by the control system SC following upon installation of the electrical household appliance 100 and/or of the auxiliary device 200 and can be typically repeated following upon each turning-on of the electrical household appliance and/or upon each power-on of the mains voltage.

The procedure through which the control system SC of the electrical household appliance makes requests for specific information from the auxiliary device 200 (represented schematically in FIG. 2*b*) occurs if the control system SC has positively verified the presence of the auxiliary device 200, and may be executed according to different modalities.

In the case where the electrical household appliance 100 presents a discontinuous operating cycle (this is the case, for instance, of a washing appliance, such as a washing machine), the control system SC executes the procedure of FIG. 2*b* at the start of each program of operation, when, having already previously received the list of the information available (via the procedure illustrated in FIG. 2*a*), it asks the auxiliary device 200 for the information deemed useful for the program that it is about to carry out. The control system SC can include in the request for information the indications of the time instants in which said information must be sent to the electrical household appliance (for example, in the case where the electrical household appliance 100 comprises a washing machine, the control system SC includes, in the request for information, the synchronization between sending of the information selected and the various phases of the washing program), or else can more simply make a request for periodic sending of information from the auxiliary device 200.

In the case where the electrical household appliance 100 presents, instead, a continuous operating cycle (this is the case, for instance, of a refrigerating apparatus such as a fridge-freezer), the control system SC executes the procedure of FIG. 2*b* following upon each power-on, asking the auxiliary device 200 to transmit thereto the useful information whenever a pre-determined time interval has elapsed and/or whenever a pre-determined condition has arisen.

In addition to the aforesaid standard modes of execution of the procedure 2*b*, it may be advantageously envisaged (both in the case of electrical household appliances with discontinuous operation and in the case of electrical household appliances with continuous operation) that said procedure may be executed by the control system SC following upon the occurrence of a pre-determined event. For example, if one of the sensors of the electrical household appliance 100 detects a parameter not in compliance with optimal operation of the electrical household appliance 100, the control system SC can carry out the procedure 2*b*, asking the auxiliary device 200 for information that can highlight a possible failure or incipient malfunctioning of the electrical household appliance 200.

FIG. 2*c* illustrates, instead, a flowchart that describes, according to a preferred embodiment of the invention, the mode with which the auxiliary device 200 declares its own presence and/or responds to the requests coming from the control system SC of the electrical household appliance 100 (FIGS. 2*a* and 2*b*).

Block 600 is the starting block of the procedure, following upon which the control logic of the device 200 sets itself in standby, awaiting a "request for presence" from the control system SC of the electrical household appliance 100 (block 610). Following upon reception of a request (block 620), the control logic sees to discriminating the nature between a simple "request for presence" and a request for information. In the first case (output YES from block 630), the control logic of the device 100 sends to the control system SC the list of information that is potentially available (block 650); in the second case, instead, the control logic of the device 100 sends the auxiliary piece or pieces of information requested to the control system SC (block 640).

Using the logic described above, the control system SC of the electrical household appliance 100 can then send to the auxiliary device 100 one or more requests for at least one of the auxiliary piece of information available. The control system SC can make just one request for all the information following upon recognition of the device 200, or else the request for information can occur in a number of time instants (according to whether the control system SC of the electrical appliance requests in a continuous or else intermittent way information regarding one or more physical variables/quantities). According to another possible approach, since the system SC knows at the start of a cycle selected by the user the set of the data that can be supplied by the external device 200 (for example, sent spontaneously following upon switching-on of the electrical household appliance), it can make a single initial request in which it defines what auxiliary information is to be supplied by the device and the mode of supply of each piece of said information (continuous sending, periodic sending, sending at a given event, sending only at the moment in which a request is made, etc.).

In the preferred embodiment of the invention, the exchange of information in point-to-point mode between the control system SC and the auxiliary device 200 uses, as transmission means, the power-supply cable 270 of the electrical household appliance 100 and, as technique of data transmission, the communication technique known as "power modulation". The reader is referred to the documents cited previously for a general description of possible embodiments of said technique. It has to be noted, however, that the exchange of information between the control system SC and the auxiliary device 200 can be implemented also in a different way, for instance through a wireless communication, particularly based on radio-frequency, by equipping the above said system and device with proper transceivers and using a communication protocol suitable for the purpose (for instance ZigBee or Bluetooth). As said above, in a particularly advantageous embodiment of the invention, an improved version of "power modulation" is used, described hereinafter with reference to FIGS. 3*a*-3*c* and 4*a*-4*b*.

Figure 3A:
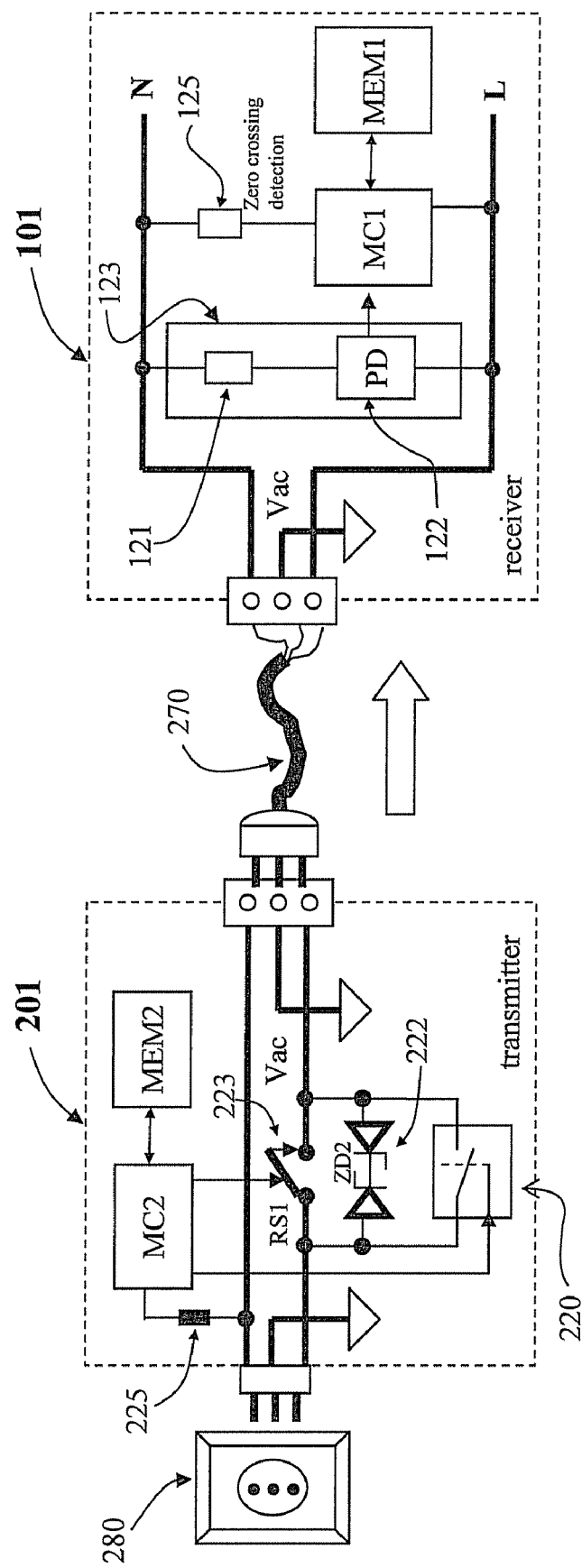
FIG. 3a represents a mode of data transmission, according to a preferred embodiment of the invention, in the direction that goes from a transmitter circuit of the control system of the auxiliary device to a receiver circuit of the control system of the electrical household appliance.

FIG. 3*a* illustrates, by way of example, a transmission circuit 201 forming part of the device 200, used for sending information and/or encoded digital data to a receiver circuit, designated by 101, forming part of the control system SC of the electrical household appliance 100.

Figure 3B:
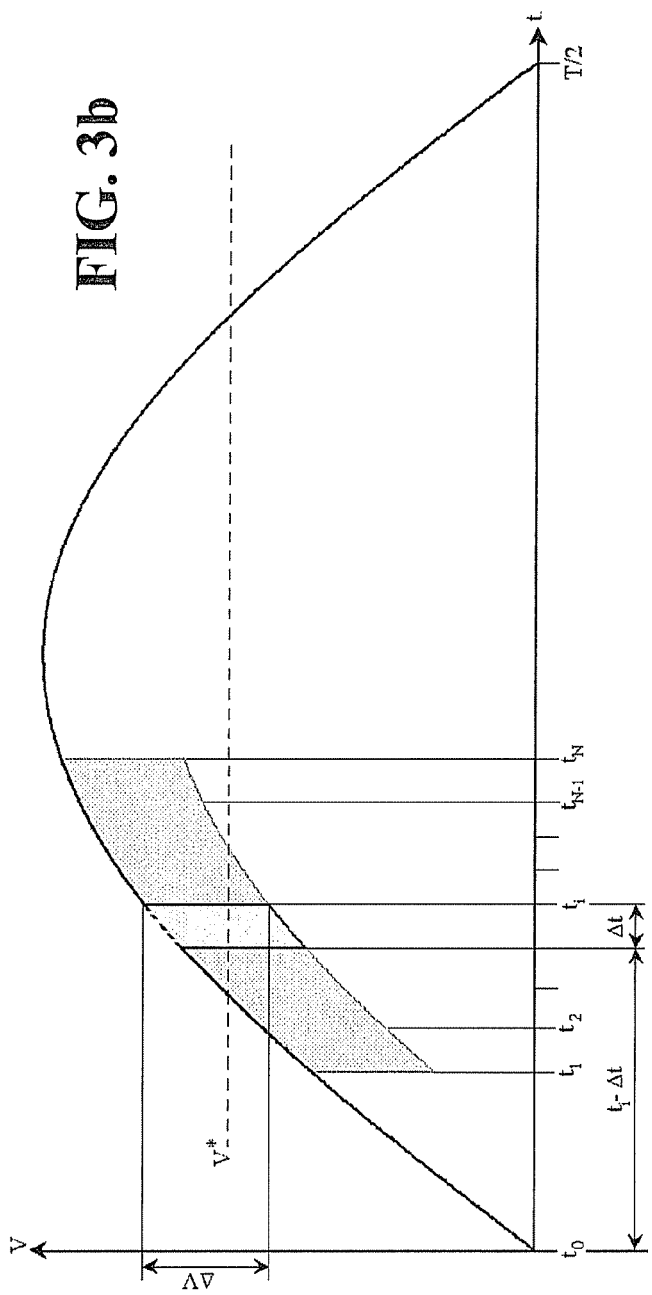
FIG. 3b is a diagram that illustrates schematically a positive half-wave of the a.c. mains voltage that supplies the system of FIG. 1, distinguished by an impulsive variation of voltage generated by the auxiliary device for the purposes of transmission of digital information, via the means of FIG. 3a, to the electrical household appliance.
Figure 3C:
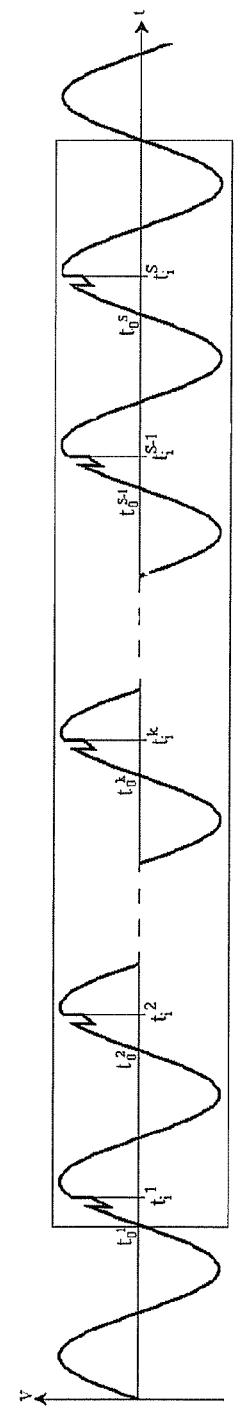
FIG. 3c is a schematic representation of a sequence of waveforms of the aforesaid mains voltage, associated to the aforesaid transmission of digital information.

In the preferred embodiment, each transmission session is constituted by a sequence of voltage pulses, to each of which is associated a sequence of a pre-determined number of bits: for example, to a sequence of voltage pulses there can be associated 1 nibble, i.e., 4 bits of binary information. Each voltage pulse is generated through a fast variation $\Delta V$ of the mains voltage, made at the instant "$t_i$", measured starting from the instant "$t_0$" corresponding to a pre-determined condition of the a.c. mains voltage that supplies the electrical household appliance 100. Preferably, the variation $\Delta V$ is a sudden positive variation of the mains voltage, with which there is restored a corresponding negative variation generated immediately before, and the instant "$t_0$" is the instant in which zero-crossing of the a.c. mains voltage occurs, as represented in FIG. 3b, where it has been assumed that the half-wave represented forms part of a sinusoidal wave having a period T (for example, T can be 20 ms in the case where the frequency of the mains voltage is 50 Hz, or else can be 16.666 . . . ms in the case where the mains frequency is 60 Hz). The same concept is represented, with reference to a sequence of network cycles, in FIG. 3c.

The time "$t_i$" belongs to a set of pre-determined values of time "$t_1, \ldots, t_N$," within the duration T/2 of a half-wave of the a.c. voltage, to which as many N pieces of information can be associated uniquely, where $N \leqq 1$. In this way, an encoding is implemented on the basis of which the instant of time "$t_i$" in which the variation is generated, measured starting from a pre-determined condition of the a.c. voltage (zero-crossing), is uniquely representative of a pre-determined piece of information.

The aforesaid nibble of information is contained, in particular, in the duration of the interval comprised between the aforesaid instants "$t_0$" and "$t_i$", there being envisaged 16 different possible time intervals, to which to associate the instant "$t_i$" of generation of the voltage pulse $\Delta V$ corresponding to the 16 possible values that can be encoded with 4 bits ($2^4=16$). The duration $\Delta t$ of the aforesaid impulsive decrease in the mains voltage, which in FIG. 3b has been deliberately amplified for reasons of greater clarity of exposition, is equivalent in actual fact to a few tens of microseconds. The value of the variation of voltage $\Delta V$ is, instead, of the order of tens of volts, i.e., relatively limited with respect to the effective value V* of the supply voltage. For example, the pre-determined value of the amplitude of the variation $\Delta V$ can be comprised in an interval that ranges from 5% to 15% of the effective value V*, preferably a value $\Delta V$ of approximately 20 V in the case where the rated voltage V* is 230 V.

In the example of FIG. 3a, the variation of voltage $\Delta V$ is obtained by opening the normally closed contact 223 of a relay RS1 and by applying an instantaneous voltage drop via appropriate means 222 (for example constituted by a pair ZD2 of Zener diodes with the same characteristics, connected in series and having in common the anode or the cathode) such as to generate an appropriate voltage drop when, upon command of the microcontroller MC2 (and on the basis of encoding parameters, which associate the instants "$t_i$" to the information to be transmitted and that are stored in the non-volatile memory MEM2) of the auxiliary device 200, the switch designated by 220 (obtained, for example, with solid-state devices of a MOSFET type) is opened at the desired instant "$t_i$" and for a very short time interval $\Delta t$. The duration $\Delta t$ is preferably pre-determined and short enough with respect to the period T of the wave of the a.c. voltage, advantageously from 0.5% to 5% of the period T. The synchronization of the operation of transmission of information to the receiver circuit 101 of the electrical household appliance 100 is obtained by means of the detector 225, operatively connected to the microcontroller MC2, which detects the zero-crossings of the a.c. mains current.

The fluctuation of the mains voltage thus obtained is transmitted through the power-supply cable 270 and is intercepted by the control system SC of the electrical household appliance 100 through a pulse decoder 123. Said decoder 123 comprises a capacitive derivative circuit 121—in itself known—(or else any electronic circuit, equivalent thereto, which is able to filter the slow dynamics of the mains voltage and to enable only the sharp variations to pass) and a pulse detector 122, which is able to apply—in the presence of a variation $\Delta V$ of the a.c. mains voltage applied to the power-supply cable 270—a signal of a low-voltage impulsive type to a purposely provided digital input of the microcontroller MC1. Said microcontroller MC1, via relations stored in respective non-volatile memory means MEM1, will then see to decoding the nibble of information received through the measurement of the time interval that elapses between the instant "$t_0$" of zero-crossing of the mains voltage, detected using purposely provided means in themselves known, designated by 125 and adapted to intercept the signal of zero-crossing of the mains voltage, and the instant "$t_i$" corresponding to the generation of the pulse $\Delta V$.

In other words, then, at the level of the electrical household appliance 100 there occurs detection of the variation $\Delta V$ and measurement of the instant of time "$t_i$", in which said detection is made, said time being measured starting from the occurrence of a pre-determined condition regarding the a.c. voltage that supplies the electrical appliance itself, i.e., the zero-crossing. Next, decoding occurs by means of association of the information corresponding to the value of time "$t_i$".

The variation $\Delta V$ of the a.c. voltage that supplies the electrical household appliance 100 will have characteristics such as to render it distinguishable from occasional fluctuations that may be present on the supply line and are due to disturbance of various nature. Said characteristics regard, in particular, the amplitude and rate (rapidity of the edges) of the variation $\Delta V$ generated for transmitting the information and are chosen in such a way as to cause the voltage pulse to be clearly distinguishable by the receiver 101 of the control system SC from a generic variation due to external factors of interference or to the very nature of the sinusoidal wave.

Figure 4A:
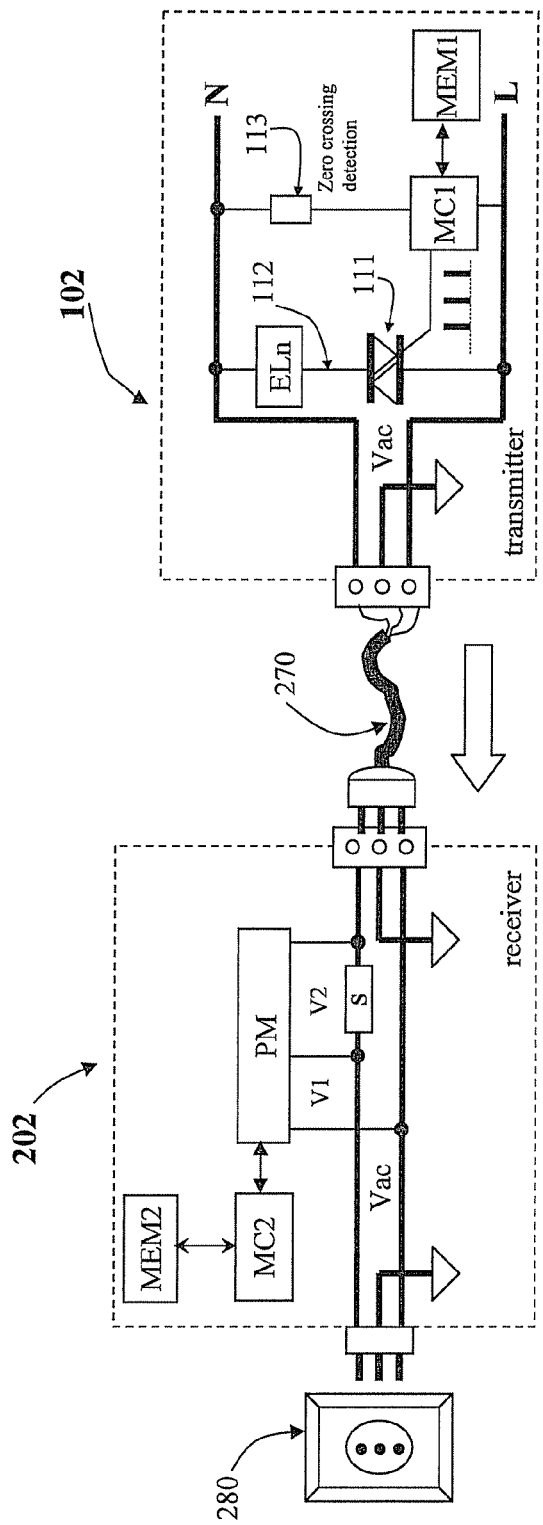
FIG. 4a represents a mode of data transmission, according to a preferred embodiment of the invention, in the direction that goes from a transmitter circuit of the control system of the electrical household appliance to a receiver circuit of the control system of the auxiliary device.

FIG. 4a describes the mode with which the electrical household appliance 100 sends, by means of a transmitter circuit designated by 102, information and/or encoded binary data to a receiver circuit, designated by 202, of the auxiliary device 200.

In this case, each transmission session is constituted by a sequence of controlled absorptions of electrical power, which are made by applying the mains voltage Vac to a given electrical load of the electrical household appliance, designated by ELn, through a triac 111, governed by the microcontroller MC1 of the control system SC with recourse to the corresponding non-volatile memory MEM1, which contains the relations used for encoding the data to be sent. Said sequence of controlled absorptions of electrical power, made within a corresponding sequence of network cycles and associated to the bits to be transmitted, results in a sequence of flows of current synchronized with the mains frequency, which, being measured in a synchronous way with the mains frequency through a so-called "power meter" PM of the receiver circuit 202 of the auxiliary device 200, enable digital signals to be derived. Said digital signals, sent to the microcontroller MC2 through an appropriate communication line, enable the latter to decode—on the basis of relations stored in respective non-volatile memory means MEM2—the information and/or the encoded binary data transmitted by the electrical household appliance 100. The synchronization of the operation of transmission of information to the receiver circuit 202 of the auxiliary device 200 is obtained by means of the detector 113, operatively connected to the microcontroller MC1, which detects the zero-crossings of the a.c. mains current.

Figure 4B:
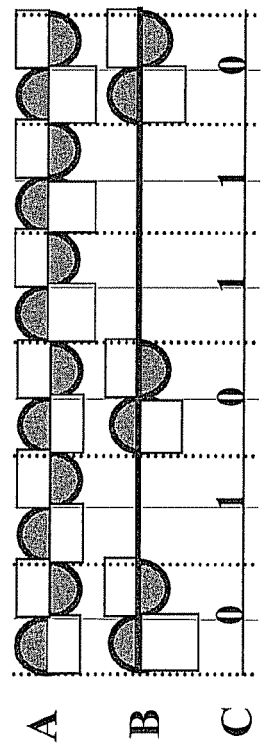
FIG. 4b is a diagram that represents schematically an example of waveforms associated to the transmission of digital information appearing in FIG. 4a, based upon impulsive power absorptions, within each mains cycle, which are generated by the transmitter circuit of the control system of the electrical household appliance.

An example of sequence of bits transmitted by means of the aforesaid technique is represented in FIG. 4b, where A designates the a.c. voltage Vac of FIG. 4a, applied to the electrical household appliance 100 between the neutral N and the line L, B designates the a.c. voltage measured in the point 112, and C designates the corresponding sequence of bits acquired by the microcontroller MC2 of the auxiliary device 200. In the specific case represented in FIG. 4b, the aforesaid sequence of bits is formed by the binary string "010110", in which to each logic "1" there corresponds activation of the triac 111 for the entire corresponding mains cycle and, likewise, to each logic "0" there corresponds deactivation of the triac 111 for the entire corresponding mains cycle.

In the embodiment exemplified, the auxiliary device 200 is equipped with means suitable for making measurements of a number of electrical quantities associated to the source of electrical energy 280 and to the operation of the electrical household appliance 100. In this perspective, for example, the power meter PM can be constituted by a device CS5460A of Cirrus Logic (USA), which is able to make the rigorous measurements of current, voltage, power factor (cos $\phi$), power, and energy. In this case (see FIG. 4a or FIG. 6), the measurement of the primary electrical quantities, represented by the current absorbed by the electrical household appliance 100 and by the voltage applied thereto, is made respectively through the measurement of the voltage V2, detected across an appropriate resistive current sensor (for example, a resistive shunt), designated by the block S, and of the voltage V1, detected through an appropriate resistive divider, which is not represented in so far as it is contained within the same device PM. The derived electrical quantities, such as cos $\phi$, power, and energy, are then obtained through appropriate mathematical processing operations, performed by the same device represented by the block PM and made available to the microcontroller MC2 for possible further processing operations.

The information regarding one or more of the aforesaid electrical quantities and/or the information made available to the device 200 via the local network 300 are exploited, according to the invention, for the purpose of improving and/or extending the performance of the electrical household appliance 100. In particular, in an advantageous embodiment of the invention, the digital control system SC of the electrical household appliance 100 and the corresponding software program are pre-arranged for enabling one or more of the following improvements of operation:

a) improvement in the function of self-diagnosis, with the possibility of carrying out a complete verification of the functionality of individual electrical parts that make up the electrical household appliance 100;

b) increase in the energy efficiency of the electrical household appliance 100;

c) increase in the effectiveness of the result of the various functions performed by the electrical household appliance 100;

d) increase in the number of functions performed by the electrical household appliance 100;

e) increase in the number of operating cycles or programs that the electrical household appliance 100 can carry out;

f) increase in the amount of information made available to the user through appropriate interface means with which the electrical household appliance 100 is possibly equipped;

g) increase in the safety of the electrical household appliance 100 in regard to the user;

h) possibility of connection at zero cost of the electrical household appliance 100 to the local network 300, possibly connected to which is the auxiliary device 200, with the possibility of bi-directional exchange of information with said local network through the mediation of the auxiliary device;

i) possibility, by the control system SC, of executing commands and/or of satisfying requests coming from the local network 300 through the mediation of the auxiliary device 200;

j) possibility of interaction of the electrical household appliance 100, by virtue of its connection to the local network 300 through the mediation of the device 200, with a user-interface device connected to the local network and purposely studied for simplifying interaction, for example, for elderly and/or disabled persons, with the electrical household appliance and/or with other electrical household appliances present in the same domestic environment and connected to the same local network;

k) possibility of interaction of the electrical household appliance 100, by virtue of its connection to the local network 300 through the mediation of the auxiliary device 200, with a supervision system connected to the local network that is able to manage possible services of a multimedia type deriving also from a wide-band connection thereof to the Internet and/or associated to the terrestrial and/or satellite digital TV;

l) possibility, by the electrical household appliance 100, of performing the "Dynamic Demand Control" (DDC) function with monitoring of the variations of the mains frequency managed by the auxiliary device 200.

Figure 5:
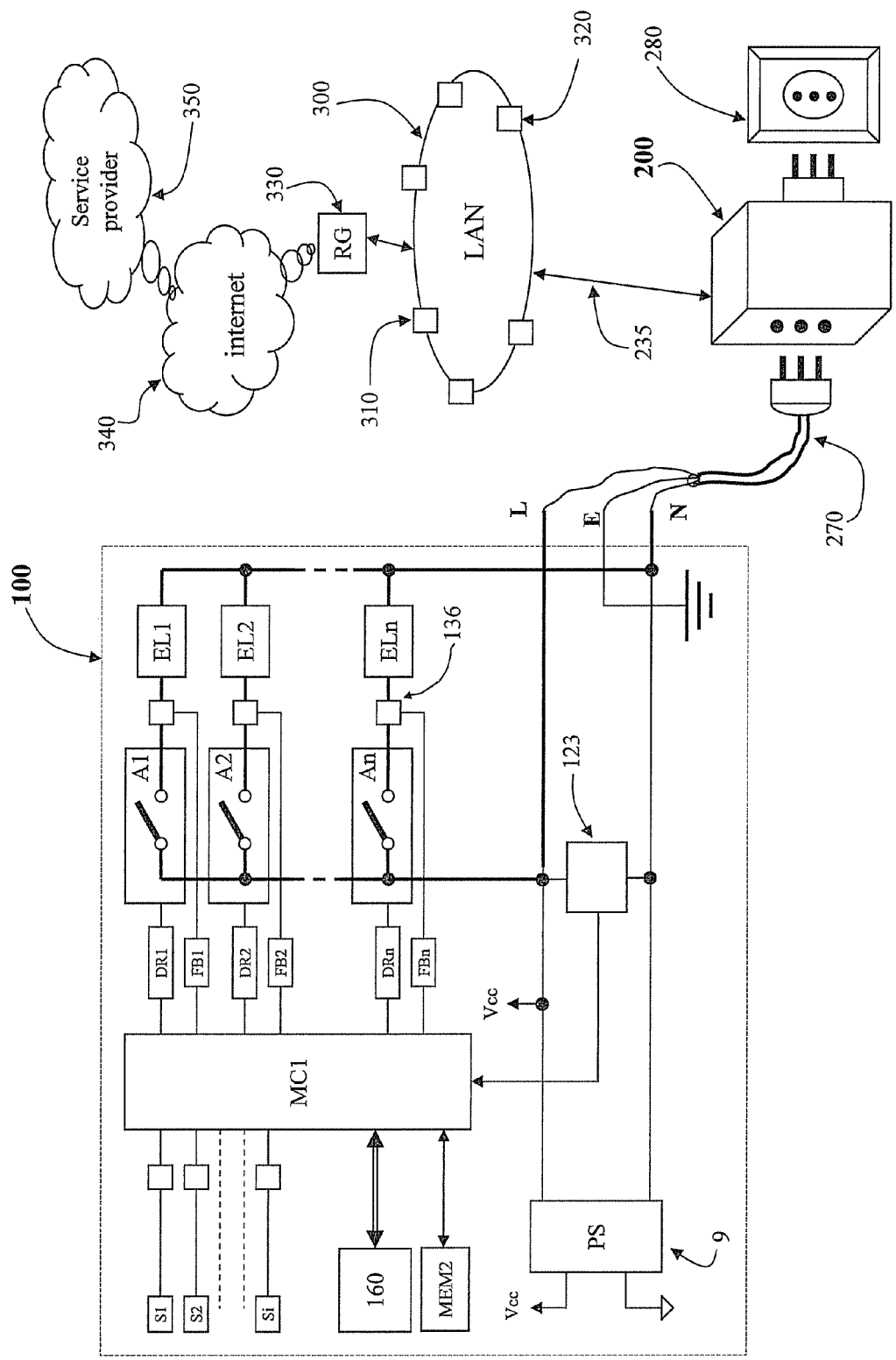
FIG. 5 is a partial and schematic representation of an example of the internal general architecture of an electrical household appliance according to the invention.

The aforesaid improvements that may potentially be associated to the system forming the subject of the present invention are examined hereinafter in greater depth.

a) Potentiation of the Function of Self-Diagnosis of the Electrical Household Appliance For a better understanding of said function, the reader is referred to FIG. 5, which illustrates in greater detail, albeit schematically, a possible internal architecture of an electrical household appliance 100 according to the invention. In said figure, designated by EL1, EL and ELn are some of the electrical loads of the electrical household appliance, and designated by A1, A2 and An are the actuators associated to said loads (for example, electromechanical or solid-state switches that control activation of said loads), whereas designated by S1, S2 and Si are the sensors installed within the electrical household appliance 100 and operatively connected to the microcontroller MC1. The actuators A1, A2 and An are driven by the microcontroller MC1 by means of the drivers DR1, DR2 and DRn. Represented moreover in FIG. 5 are the power supply 9, designed to generate, starting from the a.c. mains voltage, the a.c. supply voltage of the electronic devices of the electrical household appliance 100 and the pulse decoder 123 previously described and having the function of circuit for receiving information encoded in "power modulation".

According to the invention, the potentiation of the function of self-diagnosis of the electrical household appliance 100 is a consequence of the fact that, upon activation of each individual electrical load EL1-ELn, the control system SC can receive an immediate feedback of the value of at least one of the electrical quantities associated to the operation of the load itself, via measurements made by the auxiliary device 200. For this purpose, encoded in the non-volatile memory means MEM1 of the control system SC is information representing electrical quantities that describe the typical correct operation of each individual load that it is intended to control. For example, following upon activation of a given electrical load, for example, the load ELn, the value of the power absorbed and/or of the current absorbed and/or of the power factor of the electrical household appliance 100, as detected by the device 200 and communicated to the control system SC, proves to be modified with respect to the preceding condition (i.e., of non-activation of that given load). The control system SC, purposely programmed, can thus detect the degree of the variation of the value or values measured and compare the values received with values kept in its own memory MEM1 and corresponding to the condition of correct operation of the load ELn. As may be appreciated, in this way the control system is able to verify the success of the activation of the load ELn and, in addition, can also analyse proper operation thereof.

The function described enables solution of the difficult problem of identification of the true cause and exact location of a possible malfunctioning of an electrical household appliance. The current systems of electronic control for electrical household appliance in general perform even complex functions of self-diagnosis, which, however, are not always able to indicate, through the warning means with which they are equipped (sound signals, warning lights, alphanumeric displays, graphic displays), the exact cause of a given malfunctioning, specifying with certainty whether the problem regards the control electronics or else whether it can be put down to parts or elements external to this. This very frequently causes erroneous replacement, by technicians carrying out assistance, of costly electronic cards that are functioning perfectly well, said costs falling very disadvantageously upon the manufacture in the case of technical intervention under warranty, or else directly on the consumer.

The aforesaid drawback can be overcome, according to the function proposed, through the current-absorption and/or power-absorption feedback described above, which corresponds to activation or deactivation of a given electrical load (ELn, in the example), or else, in an even more effective way, through said current-absorption and/or power-absorption feedback combined with the further feedback signal associated to the actuator (An, in the example) of the electrical load in question. See in this connection FIG. 5, where the voltage signal, present on the contact 136 of the connector to which the electrical load ELn is connected by means of an appropriate wiring, is sent back to an input of the microcontroller MC1 through a feedback circuit FBn, of a type in itself known, which adapts the level of said voltage signal to the electrical characteristics of the same input of the microcontroller.

In conclusion, the combined action of the feedback circuit (FB1-FBn) present on the card, where there resides the microcontroller MC1 of the control system SC, and of the value of the current and/or of the power, and/or of the power factor, provided by the auxiliary device 200 according to the present invention, enables the microcontroller MC1 to verify correct actuation of an electrical load and its proper operation. Instead, in the case where any failure were to occur, the microcontroller MC1 would be able to know exactly, by virtue of the combination of the two aforesaid feedbacks, whether the problem regards the electronic card, or else whether it regards the electrical load or its system of connection to the electronic card itself. The result of said analysis can appear, for example, on a display of the control panel 160 of the electrical household appliance, with indication of the electrical load in question.

b) Increase in the Energy Efficiency of the Electrical Household Appliance

The increase in the energy efficiency of the electrical household appliance 100 is pursued by exploiting, from amongst the auxiliary information that the device 200 is able to provide, the information that can help the control system SC to achieve, through a software program, control strategies that will enable, either directly or indirectly, reduction in the energy consumption of the electrical household appliance itself and/or minimization of the cost of running thereof. Information of this sort can be of the type described hereinafter purely by way of non-limiting example.

i) Temperature of the hot water present in the sanitary-water-supply circuit of the domestic environment in which the electrical household appliance 100 is installed, in the case where the latter is of the type equipped with an inlet for the hot water controlled by a purposely provided solenoid valve. In this case, the control system SC is put in the condition where it is able to manage any charging of hot water so as to meet the requirements of operation of the electrical household appliance 100, limiting to the minimum, or even eliminating altogether, the need to heat up the water internally through the electrical means with which the electrical household appliance is equipped (typically a heating resistor). The temperature value can be supplied by the same apparatus that produces sanitary hot water (for example, a gas boiler) through the communication network 300, to which both said apparatus and the auxiliary device 200 are connected. A possible technique for managing charging of hot water according to this philosophy is described, for example, in EP-A-1 396 687.

ii) Structure of the time ranges with different tariffs of the electrical energy. The availability of said information (detected by the device 200 via the network 300 and made available on the latter, for example, via the Internet or by the energy utility) enables the control system SC to carry out, automatically or else through an appropriate command from of the user, an operating cycle during a time range with minimum energy tariff, as described, for example, in the European patent application EP-A-1 434 056.

iii) Measurement of the total power absorbed, instant by instant, by the domestic environment in which the electrical household appliance 100 is installed. Said measurement, carried out and made available by the device 200, is used by the control system SC for self-limiting the absorption of electrical power of the electrical household appliance 100 so as to prevent overstepping of the maximum limit established by the value of the contractual power and, at the same time, enable said electrical household appliance to continue to carry out its own function. The value of the total power absorbed by the domestic environment and that of the contractual power can be supplied to the device 200 by a digital device for measuring the electrical energy connected to the network 300, for example, in accordance with what is described in EP-A-0 727 668.

iv) Measurement of the electrical energy consumed in the various stages of operation of the electrical household appliance 100 or during an entire operating cycle thereof. The value of said measurement, detected and made available by the device 200 may be used by the control system SC for better management of the energy consumption of the electrical household appliance 100 and possibly for sensitizing the user in regard to the consumption, in relation to the type of program of operation selected and to the type of options made, for example, in accordance with what is described in EP-A-0 844 326.

The piece of information i)-iv) referred to above can be advantageously displayed to the user on the display of the panel 160.

c) Increase in the Effectiveness of Operation of the Electrical Household Appliance The increase in the effectiveness of the result associated to the various functions performed by the electrical household appliance 100 is obtainable by virtue of the fact that its control system SC has available, according to the invention, further information on the process of operation of the electrical household appliance itself and on its working conditions.

Amongst the information generated by the auxiliary device 200, of particular importance is, for example, the value of the mains supply voltage, because it enables the control system SC to manage in the best possible way the individual electrical loads, operation of which is frequently considerably conditioned precisely by the value of the supply voltage. This is the case, for example, of the universal motor that is widely used in European washing machines, the efficiency of which decreases considerably as the mains supply voltage decreases. In this case, in order to prevent excessive overheating of the motor at supply voltages lower than the rated value, the control system SC of a washing machine 100 will be able to manage appropriately the durations of the steps of activation and those of deactivation of the motor as a function of the value of the corresponding supply voltage.

Likewise, among the information that can be acquired from the network 300 by the auxiliary device 200, of particular interest is the aforementioned value of the temperature of the sanitary hot water available in the domestic environment in which, for example, a washing machine and/or a dish-washer are/is installed. Said information enables the control system SC of said electrical household appliance to reduce the duration of the corresponding washing cycles and, at the same time, minimize the consumption of electrical energy thereof, as already described above.

d) Increase in the Number of Functions Performed by the Electrical Household Appliance The possibility of increasing the number of the functions that the electrical household appliance 100 can carry out derives from the fact that the control system SC has available, according to the invention, auxiliary information that make it possible to offer to the user new options, with respect to the "standard" ones associated to the sources of information of the electrical household appliance itself (i.e., its internal sensors). Non-limiting examples of said new options can be the following: option for automatic activation of the electrical household appliance during the first time range with minimum energy tariff, option for operation of a cycle of the electrical household appliance with pre-set consumption of electrical energy, option for use by the electrical household appliance of the sanitary hot water available in the water-supply circuit to which the electrical household appliance is connected, and so forth.

The various additional options can be selected by the user via the control and display means provided on the panel 160.

e) Increase in the Number of Programs of the Electrical Household Appliance

Also in this case, the possibility of making available to the user operating cycles or programs additional with respect to the standard ones normally provided derives from the fact that, according to the invention, the control system SC has available additional information with respect to the standard information associated to the sources of information of the electrical household appliance itself (i.e., its internal sensors). Non-limiting examples of operating cycles or additional programs can be the following: cycle or program of self-diagnosis that is able to provide the user with a complete picture of the state of efficiency of the electrical household appliance; cycle or program using only the sanitary hot water available in the domestic environment in which the electrical household appliance is installed; program of information for the user regarding the effective energy consumption of the electrical household appliance, together with recommendations for use to reduce said consumption, and so forth.

Also in this case, the cycles or additional programs will be exploitable via the control and display means provided on the panel 160.

f) Increase in the Amount of Information for the User

Also the increase in the number of the warnings that the electrical household appliance 100 can make available to the user through its interface means 160 derives from the fact that the control system SC has available, according to the invention, a large amount of additional information with respect to the standard information associated to the sources of information of the electrical household appliance itself (its internal sensors). Non-limiting examples of said additional information can be the following: option for display of the electrical quantities associated to the operation of the electrical household appliance; option for display of the power absorption of the entire domestic environment in which the electrical household appliance is installed; option for display of the current time and date; option for display of information coming from the local network 300 to which the device 200 is connected; option for display of the cost of the electrical energy for the various time ranges (for example, acquired through the Internet via the local network 300); option for display of other information coming indirectly from the Internet, and so forth. The various piece of information referred to above are advantageously displayed for the user on the display of the panel 160.

g) Increase in the Global Safety of the Electrical Household Appliance

The increase in the global safety of operation of the electrical household appliance 100 derives from the possibility, by the control system SC, of receiving, through the mediation of the auxiliary device 200, information generated by sensors 310 that control the safety of the home environment and are connected directly or indirectly to the local network 300. By way of non-limiting example, there may be cited the case where, following upon detection of gas leaks, the electrical household appliance is set automatically in a safety condition, modifying or suspending its operation in order to eliminate any either direct or indirect risk of generation of dangerous sparks. A similar reasoning applies in the case where the presence of smoke is detected, or else flooding, and so forth.

Possible alarms of this type can be advantageously displayed to the user on the display or via warning lights provided on the panel 160.

h) Connection in Network of the Electrical Household Appliance at Zero Cost

One of the most important and advantageous improvements that the electrical household appliance 100 can exploit as a result of the present invention is represented by its possibility of connection to the network at zero cost. This is obtained, as extensively described above, through the mediation of the auxiliary device 200, which can virtually connect up to any local network, leaving the electrical household appliance 100 completely independent of the constraints represented by the type of local network adopted. The only constraint for the control system SC is the capacity of interaction, through the cited "power modulation" communication technique, with the auxiliary device 200, which performs the function of "proxy", i.e., of a device that is able to set in relation two communication systems of different complexity, performing a protocol conversion between the simple point-to-point communication of the electrical household appliance 100 with the auxiliary device 200 and the communication on the local network 300, of greater complexity, to which the auxiliary device may possibly be connected. In particular, the contents and the structure of the information, associated according to the invention to the interaction between the electrical household appliance 100 and the device 200, are defined in accordance with the rules of inter-operability between products of different manufacturers, established in the field of the activities of standardization promoted by the main worldwide organizations of manufacturers of electrical household appliances.

i) Execution of Commands and Satisfaction of Requests by the Electrical Household Appliance The possibility, by an electrical household appliance 100 according to the invention, of executing commands and responding to requests coming from the local network 300 is a direct consequence of its connection to said network by means of the auxiliary device 200 and of the fact that the control system SC has available for this purpose, according to the invention, software programs that govern reliably execution of said commands and satisfaction of said requests.

The commands that the electrical household appliance 100 can execute and the requests that it can satisfy are at least the ones envisaged in the framework of the aforesaid standardization activities, aimed at rendering the various products inter-operable, said activities being promoted by the main organizations of manufacturers of electrical household appliances (such as, for example, CECED in Europe, Echonet in Japan, and AHAM in the United States).

The commands that the electrical household appliance 100 can execute and the requests that it can satisfy can be sent, according to the invention, through a cellphone, a PC, a PDA, and/or any other device that is able to communicate, either directly or indirectly, with the local network 300 to which the auxiliary device 200 is connected.

j) Simplified Interaction with the Electrical Household Appliance

The increasingly widespread introduction of digital technologies in the field of electrical household appliances is offering to manufacturers two major opportunities: the possibility of pursuing targets of maximum standardization of the hardware circuit of the control systems, with considerable benefits in terms of reduction in the costs deriving from the economies of scale, and the possibility of increasing considerably product potential, in terms of improvement in the performance and increase in the number of the functions performed, thanks to the flexibility of the software of the control systems. All this, however, is also progressively modifying the way of interacting with the various products, requiring of the user an ever-increasing acquaintance with the electronic technologies, which are continuously evolving, and at the same time causing an ever-increasing inconvenience for the weaker classes of users of electrical household appliances, constituted by elderly and/or disabled persons.

The above problem can be solved, according to the invention, by means of the possibility of interaction of the electrical household appliance 100, by virtue of its connection to the local network 300 through the mediation of the auxiliary device 200, with a user-interface device (designated as a whole by 320 in FIG. 5), connected to the same local network, aimed at simplifying the interaction with the electrical household appliance and/or with other electrical household appliances present in the same domestic environment, connected to the same local network, by elderly and/or disabled persons.

The general characteristics of a user-interface device 320 of the sort, referred to purely by way of non-limiting example, can be the following:

control means constituted by push-buttons and/or knobs, each characterized by an explicit description of the function performed, said description being in particular made also with Braille characters for blind people;

output devices constituted by displays with characters having dimensions and characteristics of brightness and contrast such as to be very visible even for persons with reduced visual capacity;

voice output device, with adjustable and also excludable volume, designed to provide, in response to each operation made by the user through the aforesaid control means, the description of the operation itself so as to enable a convenient verification of correctness thereof, and designed likewise to recommend the actions to perform to complete selection of an operating cycle of the electrical household appliance 100 in the case where the user shows uncertainty through an excessively long pause (i.e., longer than a pre-set number of seconds);

connection to the local network 300 by means of a wireless communication system so as to enable the device 200 to be located anywhere, for example, on board wheelchairs for disabled persons, thus performing the function of a specialized remote control;

supply from the mains network and/or from a battery that may possibly be rechargeable.

k) Interaction of the Electrical Household Appliance with a Programmable External Device Possible programmable devices with which the electrical household appliance 100 can interact, by virtue of its connection to the local network 300 through the mediation of the device 200 according to the invention, can be personal computers, and/or cellphones, and/or PDAs, and/or home-supervision systems, and/or multimedia apparatuses based upon Microsoft Windows Media Center or similar hardware and software systems, and/or any other device or apparatus that envisages the possibility of interaction with domestic electrical appliances in general and, in particular, electrical household appliances.

Also this additional function can advantageously exploit the presence of the setting and display means provided on the panel 160.

l) Management by the Electrical Household Appliance of the "Dynamic Demand Control" (DDC) Function The DDC function referred to previously regards the question of dynamic balancing between the amount of electrical energy produced upstream by the generators that supply a given system for distribution of electrical energy and the one used downstream by the set of all the electrical appliances supplied by said distribution system. It is known, in fact, that the condition of maximum efficiency of a system for distribution of electrical energy exists when the power generated and introduced on the corresponding distribution grid is equivalent to the one effectively absorbed by the set of the electrical appliances connected to that network, namely, when the total amount of electrical power generated is in equilibrium with the total amount of power absorbed. Situations of inefficiency emerge, instead, when there exists an imbalance between the power generated and the one effectively required by the totality of the users connected to a given network for distribution of electrical energy. An interesting technique for minimizing sudden fluctuations of absorption of electrical power is described in the U.S. Pat. No. 4,317,049 and is based, precisely, upon the concept of "Dynamic Demand Control", i.e., upon the dynamic control of the request for electrical power made directly and automatically by the loads themselves. According to said technique, a set of appliances using electrical energy, connected to a given distribution network, modify their corresponding power consumption, within given limits and without jeopardizing their own functionality in order to minimize sudden variations of the total absorption of electrical power from said distribution network, in accordance with the effective conditions of load of the latter, detected through the measurement of the corresponding mains frequency. The value of the mains frequency constitutes a reliable indicator of the condition of load of a given network for distribution of electrical energy: in particular, when the consumption of the totality of the appliances tends to overstep the amount of electrical power that can be supplied by the network, the frequency tends to drop with respect to its rated value (typically 50 or 60 Hz) by a few hundredths of hertz, according to a known law; instead, when the power consumption is lower than the potentiality of the network, the frequency tends to increase in a similar way with respect to its rated value.

The solution provided in U.S. Pat. No. 4,317,049 hence envisages appropriate reduction in the power absorptions of the individual electrical appliances when the mains frequency decreases by a given amount with respect to its rated value, and appropriate increase of said absorptions when the mains frequency tends to overstep the rated value. The fact that the totality of a significant set of electrical appliances is able to monitor, instant by instant, the possible variations in the mains frequency with respect to its rated value and may react at the same instant to said variations guarantees that said operations of reduction or increase in the power absorptions occur in a way that is perfectly synchronous and hence such as to produce, by superposition of the effects, the desired corrective action. According to the solution referred to previously, moreover, the control system of each electrical appliance is able to vary the power absorptions, associated to the corresponding internal electrical loads, without jeopardizing proper operation thereof, i.e., without penalizing the quality of the performance offered to the user. Electrical appliances more suitable for performing the DDC function are the ones that are able to defer or anticipate their own absorption of electrical power without jeopardizing their own functionality for the benefit of the user, such as, for example, refrigerators, freezers, boilers, air conditioners, and also washing machines and dish-washers.

In the case of the present invention, the electrical household appliance 100 is put in the condition of being able to perform the DDC function, given that the monitoring of the variations of the mains frequency is governed by the auxiliary device 200.

For said purpose, the device 200 can be provided with appropriate means for rigorous measurement of the fluctuations of the mains frequency and, in the hypothesis of significant variations of frequency for the purposes of the DDC function, signals the event to the electrical household appliance 100, the control system SC of which will for this purpose be pre-arranged for modifying its own power absorption, in accordance with the algorithm associated to the DDC function itself.

As has been said, the control system SC of the electrical household appliance 100 provided according to the present invention is adequately pre-arranged, from the standpoint of the corresponding management software, for implementing the improvements of operation exemplified previously. In the preferred embodiment, the control system SC is provided in the production stage for enabling execution both of the "standard" functions and of the supplementary functions made possible only thanks to the auxiliary device 200. For said purpose, in the preferred version of the invention, encoded in the memory means MEM1 associated to the microcontroller MC1 of the control system SC is the software that enables the electrical household appliance 100 to carry out its own standard functions, using the control and/or display means present on its panel 160. Also encoded in the non-volatile memory means of the control system SC is the software that enables the system itself to manage the quantities or the information supplied by the device 200 or else enables execution of the additional functions. Of course, the specific programming techniques used do not fall within the scope of the invention and may be chosen by the person skilled in the art from amongst the ones commonly used for programming microcontrollers for control systems of electrical household appliances.

From what has been described previously it emerges how the control system of the electrical household appliance built according to the teachings of the invention, when associated to the auxiliary device, may be provided with an increased amount of information so as to improve and/or extend decidedly the range of performance and the functions offered as compared to the basic ones. The explanations for the user of the additional features of performance and functions may be contained in the classic user manual of the electrical household appliance 100 and/or in a manual that accompanies marketing of the auxiliary device 200; said explanations can on the other hand be encoded in electronic form, in the memory means MEM1 and/or MEM2, in order to enable display thereof by the user directly on the display of the control panel 160 of the electrical household appliance.

The electrical household appliance according to the invention is perfectly able to perform its own basic characteristic functions, as any standard electrical household appliance: the product can thus be freely marketed and guarantee satisfactory performance even in the absence of the auxiliary device. As has been explained, the pre-arrangement of the electrical household appliance for the purposes of its possible association with the auxiliary device does not determine significant increases in of the production cost.

The auxiliary device thus represents an "optional" of the electrical household appliance, it being possible to purchase the former also after purchasing the latter. The practical installation of the auxiliary device can be made directly by the user, who merely needs to insert a part shaped like a plug of the device in an electrical socket, and insert the plug of the power-supply cable of the electrical household appliance in a part shaped like a socket of the device. As may be seen, moreover, in the preferred embodiment of the invention, the control system SC of the electrical household appliance 100 is able to recognize autonomously the presence of the external device 200, and act accordingly to exploit the auxiliary information that the latter makes available so as to improve the performance of the product and offer new functions.

From the foregoing description there clearly emerge the characteristics of the present invention, as likewise clearly emerge the advantages thereof. It is evident that numerous variations may be made by a person skilled in the art to the embodiment described previously by way of example, without thereby departing from the scope of the invention, as defined in the claims that follow.

The function of automatic recognition, by the control system SC, of the presence of the device 200 and/or of the type of auxiliary information that this can provide (previously described with reference to FIGS. 2a and 2b), albeit particularly advantageous, is not essential for the purposes of implementation of the invention. In a possible variant, in fact, the control system SC can be equipped with a communication port for interconnection to an external programming device (for example, a portable computer) in such a way that the presence and/or the list of auxiliary information made available by the device 200 is communicated to the control system SC via said programming device by specialized staff when the device 200 is installed.

The invention claimed is:

1. A system comprising
an electrical household appliance connected to a source of electrical energy and including a digital control system that is configured for enabling performance of a plurality of pre-determined basic functionalities by the electrical household appliance; and
an auxiliary device configured to acquire and/or process auxiliary information, the auxiliary device further configured to communicate data in a point-to-point mode with the electrical household appliance;
the control system of the electrical household appliance configured to:
verify autonomously the presence of the auxiliary device by sending a request for presence of the auxiliary device,
recognize, in response to the request for presence, the presence of the auxiliary device if within a given time interval the control system receives from the auxiliary device a list of types of auxiliary information the auxiliary device is able to provide to the control system,
enable execution of one or more functionalities that are additional with respect to said basic functionalities,
send to the auxiliary device, at least one request regarding at least one piece of auxiliary information necessary for execution of one or more of said additional functionalities; and
receive from the auxiliary device, following said at least one request, said at least one auxiliary piece of information to execute the one or more additional functionalities, said at least one auxiliary piece of information being a value of an electrical quantity associated with said source of electrical energy and/or with the operation of the electrical household appliance,
said electrical quantity being in particular selected from among: supply voltage, mains frequency, electric power and/or electric current absorbed by the electrical household appliance, angle of phase displacement between the supply voltage applied to the electrical household appliance and the electric current absorbed thereby, and electrical energy consumed by the electrical household appliance in a time interval.

2. The system according to claim 1 wherein the auxiliary device is electrically connected between an electrical supply of the electrical household appliance and an electric power socket, and
the auxiliary device is configured to communicate with the electrical household appliance over a power supply cable.

3. The system according to claim 2, wherein the auxiliary device is configured to supply on said power-supply cable an a.c. voltage drawn from said electric-power socket, and the auxiliary device is configured to:
associate to a time value, $t_i$, a piece of information to be transmitted, where said time value $t_i$ is comprised in a set of pre-determined time values $t_1, \ldots, t_N$ and where said pre-determined time values $t_1, \ldots, t_N$ are measured starting from the occurrence of a pre-determined condition regarding the a.c. voltage, in particular zero-crossing by the a.c. voltage; and
generate at least one variation, $\Delta V$, of the a.c. voltage that can be supplied via the auxiliary device to the electrical appliance, substantially at said time value $t_i$.

4. The system according to claim 3, wherein the auxiliary device is configured to associate and generate by causing a reduction in the a.c. voltage that can be supplied by the auxiliary device and for interrupting said reduction in the a.c. voltage substantially at said time value $t_i$, said reduction in the a.c. voltage being in particular maintained for a pre-determined period of time $\Delta t$ and having a pre-determined amplitude.

5. The system according to claim 1 wherein the auxiliary device is further configured to receive and/or transmit data, in peer-to-peer mode with an external communication network.

6. The system according to claim 5, wherein the auxiliary device is pre-arranged for acquiring at least one further piece of auxiliary information from said external network, where said at least one further piece of auxiliary information acquired from said external network is selected from among: current time, current date, contractual value of the electrical power, cost of the electrical energy, information coming from a service provider, warnings of conditions of excessive absorption of electrical power, warnings of variations of the mains frequency, alarm warnings, and information available on the Internet and/or coming from devices and/or apparatuses and/or systems connected directly or indirectly to said local network.

7. The system according to claim 6, wherein said additional functionality or functionalities include one or more of the following:
execution of commands and/or satisfaction of requests coming from said local network by the control system of the electrical household appliance;
interaction of the electrical household appliance with a user-interface device connected to said local network; and
interaction of the electrical household appliance with a supervision system connected to said local network.

8. The system according to claim 1 wherein said additional functionality or functionalities include one or more of the following:
activity of self-diagnosis by the electrical household appliance, in particular with verification of operation of individual electrical parts of the electrical household appliance itself;
increase in energy efficiency of the electrical household appliance;
increase in effectiveness of a result of operations performed by the electrical household appliance;
increase in a number of functions, operating cycles or programs that the electrical household appliance can carry out;
increase in the number and/or type of information made available through interface means of the electrical household appliance;
increase in safety in operation of the electrical household appliance; and
execution, by the electrical household appliance, of dynamic demand control functions.

9. The system according to claim 1 wherein the electrical household appliance is further configured to interact with a display, on which said at least one piece of auxiliary information can be displayed.

10. An electrical household appliance, prearranged for use with an auxiliary device that communicates auxiliary information over a power supply cable of the electrical household appliance, the electrical household appliance being configured to:
communicate with said auxiliary device and including a control system pre-arranged for:
verifying autonomously the presence or otherwise of the auxiliary device;

verifying the presence or otherwise of the auxiliary device before carrying out any cycle or program of operation of the electrical household appliance; and verifying the presence or otherwise of the auxiliary device by means of sending a request for declaration of the presence and recognizing as effective the presence of the auxiliary device if said auxiliary device sends properly to the control system within a given time interval a list of the type of auxiliary information that the auxiliary device is able to provide to the control system subsequent to an instant of sending of said request for declaration of presence;

using at least one piece of auxiliary information, necessary for the execution of one or more of the additional functionalities that are additional with respect to the basic functionality of the electrical household appliance, provided by the auxiliary device if and only if the auxiliary device supplies correctly to the control system said at least one piece of auxiliary information within a given maximum time from a corresponding request by said control system; and selectively sending to the auxiliary device at least one piece of information regarding operation of the electrical household appliance, in order to make available the information itself on an external communication network, wherein said at least one piece of auxiliary information being a value of an electrical quantity associated with a source of electrical energy for the electrical household appliance.

11. The electrical household appliance according to claim 10, wherein said control system is pre-arranged for using said at least one piece of information for the purpose of executing the one or more additional functionalities that are at least one of:

modifying at least one phase of a cycle of current operation of the electrical household appliance so as to improve energy efficiency of said operating cycle and/or improve global energy efficiency of an environment in which said electrical household appliance is installed and/or improve effectiveness of a result of said operating cycle in relation to working conditions of said electrical household appliance and/or guarantee performance of said operating cycle in a condition of safety in regard to an user;

verifying, during execution of an operating cycle of the electrical household appliance, proper operation of at least one actuator device of the electrical household appliance used for execution of a same operating cycle; and making available to the user, through interaction means of the electrical household appliance, at least one additional piece of information and/or one additional functionality and/or one additional operating cycle beyond the ones that the electrical household appliance itself is able to provide in absence of the auxiliary device.

12. The electrical household appliance according to claim 11 wherein said additional functionality or functionalities include one or more of the following:

activity of self-diagnosis by the electrical household appliance, in particular with verification of operation of individual electrical parts of the electrical household appliance itself;

increase in the energy efficiency of the electrical household appliance;

increase in the effectiveness of the result of operations performed by the electrical household appliance;

increase in a number of functions, operating cycles or programs that the electrical household appliance can carry out;

increase in the number and/or type of information made available through interface means of the electrical household appliance;

increase in the safety in the operation of the electrical household appliance; and execution, by the electrical household appliance, of dynamic demand control functions.

13. The electrical household appliance according to claim 11, wherein said additional functionality or functionalities include one or more of the following:

execution of commands and/or satisfaction of requests coming from said local network by the control system of the electrical household appliance;

interaction of the electrical household appliance with a user-interface device connected to said local network; and interaction of the electrical household appliance with a supervision system connected to said local network.

14. The electrical household appliance according to claim 10 further configured to interact with a display, on which said at least one piece of auxiliary information can be displayed.

15. An auxiliary device pre-arranged for communication with an electrical household appliance over a power supply cable of the electrical household appliance, the auxiliary device further configured to:

communicate presence of the auxiliary device to the electrical household appliance by sending to the electrical household appliance within a given time interval from receipt of a request of presence from the electrical household appliance a list of the types of auxiliary information that the auxiliary device is able to provide;

acquire and/or process the auxiliary information, by measuring one or more electrical quantities that constitute at least one piece of auxiliary information associated with one or more additional functionalities of the electrical household appliance that are additional with respect to a basic functionality of the electrical household appliance;

wherein the acquiring and/or processing is responsive to receiving of at least one request regarding the at least one piece of auxiliary information from the electrical household appliance, said at least one piece of auxiliary information being a value of an electrical quantity associated with a source of electrical energy for the electrical household appliance; and communicate said at least one piece of auxiliary information to said electrical household appliance to execute said one or more additional functionalities.

16. The device according to claim 15 wherein the auxiliary device is pre-arranged for communicating the presence spontaneously and/or upon request, via a communication means.

17. The device according to claim 16 wherein the auxiliary device is pre-arranged for communicating spontaneously and/or upon request, via the communication means, the list of types of auxiliary information.

18. The auxiliary device according to claim 15 further configured to receive and/or transmit data, in peer-to-peer mode with an external communication network.

19. The device according to claim 18, wherein the auxiliary device is pre-arranged for acquiring at least one further piece of auxiliary information from said external network, where said at least one further piece of auxiliary information acquired from said external network is selected from among: current time, current date, contractual value of the electrical power, cost of the electrical energy, information coming from a service provider, warnings of conditions of excessive absorption of electrical power, warnings of variations of the mains frequency, alarm warnings, and information available on the Internet and/or coming from devices and/or apparatuses and/or systems connected directly or indirectly to said local network.

20. The device according to claim 15, wherein the auxiliary device is configured to supply on said power-supply cable an a.c. voltage drawn from said electric-power socket, the auxiliary device further configured to:

associate to a time value, $t_i$, a piece of information to be transmitted, where said time value $t_i$, is comprised in a set of pre-determined time values $t_1, \ldots, t_N$ and where said pre-determined time values $t_1, \ldots, t_N$ are measured starting from the occurrence of a pre-determined condition regarding the a.c. voltage, in particular zero-crossing by the a.c. voltage; and generate at least one variation, $\Delta V$, of the a.c. voltage that can be supplied via the auxiliary device to the electrical household appliance, substantially at said time value $t_i$.

21. The device according to claim 20, wherein the auxiliary device configured to associate and generate is pre-arranged for causing a reduction in the a.c. voltage that can be supplied by the auxiliary device and for interrupting said reduction in voltage substantially at said time value $t_i$ said reduction in voltage being in particular maintained for a pre-determined period of time $\Delta t$ and having a pre-determined amplitude.

* * * * *

UNITED STATES PATENT AND TRADEMARK OFFICE
CERTIFICATE OF CORRECTION

PATENT NO. : 8,319,599 B2
APPLICATION NO. : 12/524270
DATED : November 27, 2012
INVENTOR(S) : Valerio Aisa et al.

Page 1 of 2

It is certified that error appears in the above-identified patent and that said Letters Patent is hereby corrected as shown below:

In the Claims:

In col. 21, line 10 should read:
Figured to communicate data in a point-to-point mode In col. 22, line 66 should read:
Verifying autonomously the a presence or otherwise of the In col. 23, line 2 should read:
Device occurs before carrying out any cycle or program of In col. 23, line 14 should read:
For the execution of one or more of the additional func- In col. 23, line 14 should read:
For the execution of one or more of the additional func- In col. 23, line 15 should read:
Tionalities that are additional with respect to the a basic In col. 23, line 33 should read:
At least one piece of auxiliary information for the purpose of executing In col. 23, line 34 should read:
The one or more of additional functionalities that are at least one In col. 24, line 33 should read:
Household appliance a list of the types of auxiliary infor- Signed and Sealed this
Nineteenth Day of November, 2013

Teresa Stanek Rea
*Deputy Director of the United States Patent and Trademark Office*

CERTIFICATE OF CORRECTION (continued)
U.S. Pat. No. 8,319,599 B2

In the Claims (cont'd):

In col. 24, lines 49/50 should read:
Tion to said electrical household appliance ~~to execute said one or more additional functionalities~~.